US008032727B2

(12) United States Patent
Brownhill et al.

(10) Patent No.: US 8,032,727 B2
(45) Date of Patent: Oct. 4, 2011

(54) METHOD AND SYSTEM FOR LOCKING OTP MEMORY BITS AFTER PROGRAMMING

(75) Inventors: Robert J. Brownhill, San Diego, CA (US); Iue-Shuenn I. Chen, San Diego, CA (US); Tony M. Turner, Foothill Ranch, CA (US)

(73) Assignee: Broadcom Corporation (US)

( * ) Notice: Subject to any disclaimer, the term of this patent is extended or adjusted under 35 U.S.C. 154(b) by 1645 days.

(21) Appl. No.: 11/025,413

(22) Filed: Dec. 22, 2004

(65) Prior Publication Data

US 2006/0020746 A1 Jan. 26, 2006

Related U.S. Application Data

(60) Provisional application No. 60/590,866, filed on Jul. 23, 2004.

(51) Int. Cl.
 *G06F 12/14* (2006.01)
(52) U.S. Cl. ........ 711/163; 711/103; 711/154; 711/170; 711/E12.091
(58) Field of Classification Search .................. None
 See application file for complete search history.

(56) References Cited

U.S. PATENT DOCUMENTS

| 5,517,453 | A | * | 5/1996 | Strain et al. | 365/185.12 |
|---|---|---|---|---|---|
| 5,592,641 | A | * | 1/1997 | Fandrich et al. | 711/103 |
| 5,729,716 | A | * | 3/1998 | Lee et al. | 711/163 |
| 5,930,826 | A | * | 7/1999 | Lee et al. | 711/163 |
| 6,154,819 | A | * | 11/2000 | Larsen et al. | 711/163 |
| 6,446,179 | B2 | * | 9/2002 | Baltar | 711/163 |
| 6,510,501 | B1 | * | 1/2003 | Ho | 711/163 |
| 6,662,262 | B1 | * | 12/2003 | Kasa et al. | 711/103 |
| 6,772,307 | B1 | * | 8/2004 | Nguyen et al. | 711/163 |
| 6,948,041 | B2 | * | 9/2005 | Chevallier et al. | 711/163 |
| 2002/0120791 | A1 | * | 8/2002 | Somalwar et al. | 709/330 |
| 2005/0135170 | A1 | * | 6/2005 | Mozdzen | 365/211 |

OTHER PUBLICATIONS

Microsoft Computer Dictionary, 2002, Microsoft Press, 5th Edition, p. 445.*

* cited by examiner

*Primary Examiner* — Matt Kim
*Assistant Examiner* — Ralph A Verderamo, III
(74) *Attorney, Agent, or Firm* — McAndrews, Held & Malloy, Ltd.

(57) ABSTRACT

Methods and systems for processing multi-stage programming (MSP) bits within one-time-programmable (OTP) memory are disclosed herein. Aspects of the method may comprise determining whether at least one MSP memory bit in the OTP memory is programmed and whether a register bit associated with said at least one MSP memory bit is asserted. If the register bit is deasserted and the MSP memory bit is unprogrammed, the MSP memory bit may be programmed. The register bit in the OTP memory may be associated with the MSP memory bit. The MSP memory bit may be programmed to logic zero or logic one. If the register bit associated with the MSP memory bit is asserted, programming of the MSP memory bit may be blocked. The register bit associated with the MSP memory bit may be reset and it may be determined whether the MSP memory bit is accessed.

30 Claims, 4 Drawing Sheets

METHOD AND SYSTEM FOR LOCKING OTP MEMORY BITS AFTER PROGRAMMING

CROSS-REFERENCE TO RELATED APPLICATIONS/INCORPORATION BY REFERENCE

This application makes reference to, claims priority to, and claims the benefit of U.S. Provisional Patent Application 60/590,866, filed on Jul. 23, 2004 and entitled "Method And System For Locking OTP Memory Bits After Programming," the complete subject matter of which is hereby incorporated herein by reference in its entirety.

FIELD OF THE INVENTION

Certain embodiments of the invention relate to memory devices. More specifically, certain embodiments of the invention relate to a method and system for locking one-time-programmable (OTP) memory bits after programming.

BACKGROUND OF THE INVENTION

One-time-programmable (OTP) memory is memory that may be programmed to a specific value only once and thereafter may not be changed. OTP memory is typically implemented as erasable programmable read only memory (EPROM) but packaged in such way so that ultra-violet light may not be used to erase contents of the EPROM.

OTP memory is often utilized in, for example, electronic devices such as cell phones, personal digital assistants (PDA), and cameras. These electronic devices all contain stored information that may be utilized for device configuration and to control certain operating modes and/or functions. In order to facilitate proper operation of these operating modes and/or functions, it is critical that stored information is not tampered with. For example, during a power ON sequence, various device register locations in a cell phone have to be read and/or written in order for the phone to power up and enter a standby mode. Similarly, when a PDA is powered ON, one or more register locations in the PDA may be read and/or written in order for the PDA to display a user programmed or default display screen and wait for a user input.

In some conventional systems, configuration information may be stored in read-only memory (ROM). However, in instances where ROM is utilized, if a change is required, the ROM has to be updated and this may entail physically removing and replacing the ROM device. Accordingly, a ROM based solution is not appropriate when information has to be programmed.

In certain instances, it may be desirable to utilize a programmable memory in which one or more memory locations may be written only once. In this regard, a one-time programmable (OTP) memory may be utilized to provide additional security for the data stored in an OTP memory. Once a bit in an OTP memory is programmed, for example, from a binary zero to a binary one, then that particular bit typically cannot be programmed again.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for processing multi-stage programming (MSP) bits within one-time-programmable (OTP) memory. Aspects of the method may comprise determining whether at least one MSP memory bit in the OTP memory is programmed and whether a register bit associated with said at least one MSP memory bit is asserted. If the register bit is deasserted and the MSP memory bit is unprogrammed, the MSP memory bit may be programmed. The register bit in the OTP memory may be associated with the MSP memory bit. The MSP memory bit may be programmed to logic zero or logic one value. If the register bit associated with the MSP memory bit is asserted, programming of the MSP memory bit may be blocked.

The register bit associated with the MSP memory bit may be reset and it may be determined whether the MSP memory bit is accessed. If it is determined that the MSP memory bit is accessed, a programming status of the MSP memory bit may be determined, where the programming status may comprise a programmed to logic one status, a programmed to logic zero status and/or an unprogrammed status. If the determined programming status comprises an unprogrammed status, the MSP memory bit may be programmed. The register bit associated with the MSP memory bit may be deasserted after programming of the MSP memory bit.

Another embodiment of the invention may provide a machine-readable storage, having stored thereon, a computer program having at least one code section executable by a machine, thereby causing the machine to perform the steps as described above for processing multi-stage programming (MSP) bits within one-time-programmable (OTP) memory.

Aspects of the system for locking one-time-programmable (OTP) memory bits after programming may comprise at least one processor that determines whether at least one MSP memory bit in the OTP memory is programmed and whether a register bit associated with the MSP memory bit is asserted. If the register bit is deasserted and the MSP memory bit is unprogrammed, the MSP memory bit may be programmed by the processor. The register bit in the OTP memory may be associated by the processor with the MSP memory bit. The MSP memory bit may be programmed to logic zero or logic one by the processor. If the register bit associated with the MSP memory bit is asserted, programming of the MSP memory bit may be blocked by the processor.

The register bit associated with the MSP memory bit may be reset by the processor and the processor may determine whether the MSP memory bit is accessed. If the MSP memory bit is accessed, the processor may determine a programming status of the MSP memory bit, where the programming status may comprise a programmed to logic one status, a programmed to logic zero status and/or an unprogrammed status. If the determined programming status comprises an unprogrammed status, the MSP memory bit may be programmed by the processor. The register bit associated with the MSP memory bit may be deasserted after the programming of the MSP memory bit.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for locking one-time-programmable (OTP) memory bits after programming. One aspect of the invention provides a method for testing each individual bit in a memory cell of an OTP memory for previously programmed data before allowing a programming cycle to occur. In this regard, the testing of each individual bit creates a bitwise lock mechanism for the OTP memory or any other suitable type of memory. The method and system for locking OTP memory bits after programming provides an extra layer of security for keeping the contents of an OTP memory safe from faulty software or malicious program attempts. The overhead in time that is incurred to test the bit before a program is allowed to program the bit is minimal and is transparent to a user. Furthermore, a malicious blocked program attempt will not appear any different than a normal program attempt. Although the invention is described with reference to OTP memory, the invention is not so limited and may be utilized for other types of memories, such as an erasable programmable read only memory (EPROM) or other types of memory.

Figure 1:
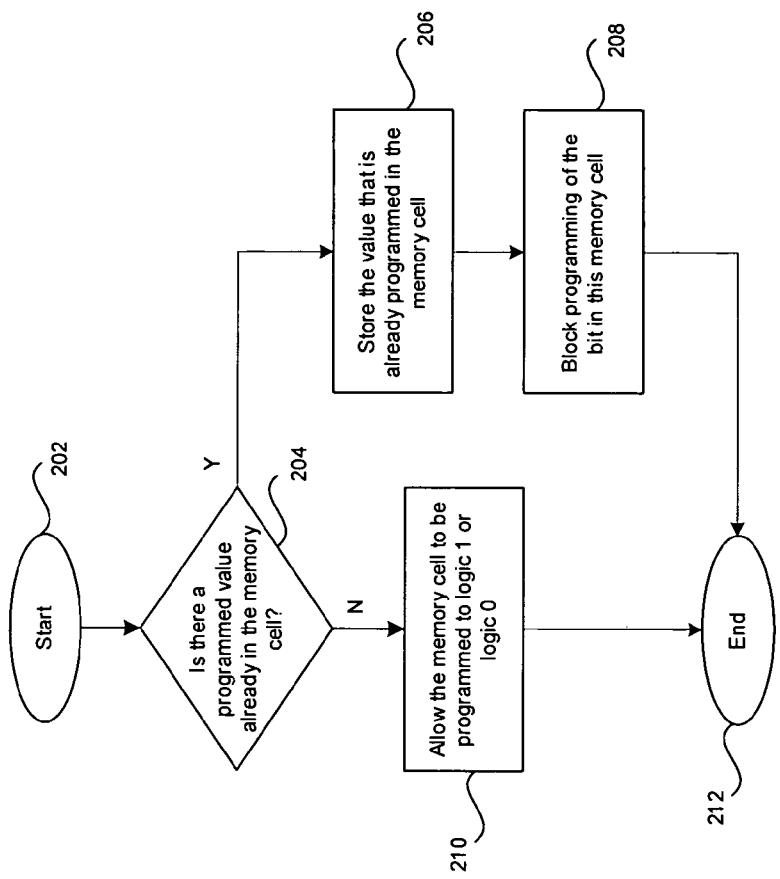
FIG. 1 is a block diagram of an exemplary system for locking OTP memory bits after programming, in accordance with an embodiment of the invention.

FIG. 1 is a flow chart illustrating exemplary steps that may be utilized for blocking a program attempt to program an already programmed OTP memory cell. Referring to FIG. 1, the exemplary steps may start with step 202. Subsequently in step 204, it may be determined whether there is a programmed value already in the memory cell. If it is determined that there is a value already programmed in the memory cell, then in step 206, the value already programmed in the memory cell may be stored. In step 208, programming of the bit in the memory cell may be blocked. If in step 204 it is determined that there is no value programmed in the memory cell, then in step 210, the memory cell is allowed to be programmed to logic 0 or logic 1. Subsequent to step 210 and step 208, the exemplary steps may end with step 212.

Figure 2:
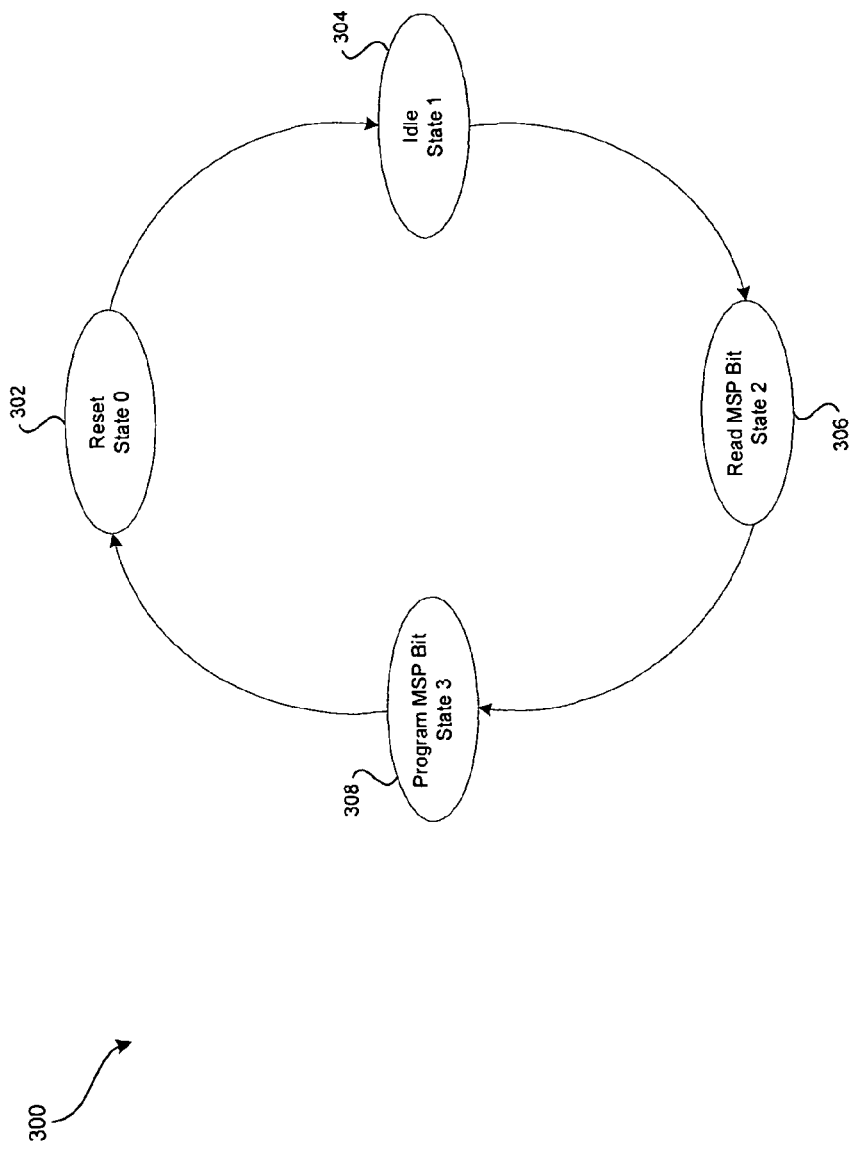
FIG. 2 is a block diagram illustrating an exemplary state machine that may be utilized for locking OTP memory bits after programming, in accordance with an embodiment of the invention.

In accordance with an embodiment of the invention, a state machine may be utilized for locking OTP memory bits after programming. FIG. 2 is a block diagram illustrating an exemplary state machine that may be utilized for locking OTP memory bits after programming, in accordance with an embodiment of the invention. Referring to FIG. 2, the state machine 300 comprises a reset state 302 (state 0), an idle state 304 (state 1), a read multi-stage programming (MSP) bit state 306 (state 2), and a program MSP bit state 308 (state 3).

In operation, the reset state 302 may be entered when the chip experiences hardware reset. A hardware reset may occur when, for example, a reset pin of the chip is asserted or the chip is powered down. While in the reset state 302, a register bit corresponding to each MSP bit may be set to, for example, logic 1. The register bit may be defined by the parameter AllowAnotherProgram[bit_number], where bit_number is an index to the corresponding bit. The AllowAnotherProgram [bit_number] specifies whether a bit is to be programmed or whether a bit should not be programmed. Hence, if the AllowAnotherProgram[bit_number] is asserted, then programming may be allowed for the bit specified by index bit_number and if it is deasserted, then programming is not allowed for the indexed bit. For example, assume that there are 32 bits, then bit_number may be within the range 0 to 31 inclusive. Accordingly, if AllowAnotherProgram[28] is asserted, then the $29^{th}$ bit may be programmed, and if deasserted, the $29^{th}$ bit shall not be programmed. After the reset state 302 is completed, the chip may transition to the idle state 304.

In the idle state 304, the chip may wait until an attempt to program the MSP bit is detected. When an attempt to program the MSP bit is detected, the chip may transition to the read MSP bit state 306.

While in the read MSP bit state 306, the MSP bit may be read from the OTP memory. A status of the bit that is to be programmed may be determined. The status may be one of: programmed to logic 1, programmed to logic 0, and unprogrammed. A parameter PROGRAMMED_TO_1 may be used to represent the status when the bit is programmed to logic 1. A parameter PROGRAMMED_TO_0 may be used to represent the status when the bit is programmed to logic 0. A parameter UNPROGRAMMED_TO_1 may be used to represent the status when the bit is unprogrammed. After determining the status of the bit to be programmed, the chip may transition to the program MSP bit state 308.

While in the program MSP bit state 308, if the determined status indicates that the chip is unprogrammed (STATUS=UNPROGRAMMED) or if the parameter AllowAnotherProgram[bit_number] is asserted (for example set to logic 1), then programming of the bit may be allowed. If the determined status is not equal to unprogrammed (STATUS!=UNPROGRAMMED), then the parameter AllowAnotherProgram[bit_number] is deasserted (for example, set to logic 0). The chip may then transition from the program MSP bit state to the reset state 302. In this regard, whenever the chip is in the idle state 304, an UNPROGRAMMED bit may be programmed twice, while a PROGRAMMED bit may be programmed once. If a bit is already programmed to logic 1 (PROGRAMMED_TO_1), any additional programming will always program it with a value of logic 1, even if an attempt is made to program the bit to logic 0. If a bit is already programmed to logic 0 (PROGRAMMED_TO_0), any additional programming will always program it with a value of logic 0, even if an attempt is made to program the bit to logic 1.

Figure 3:
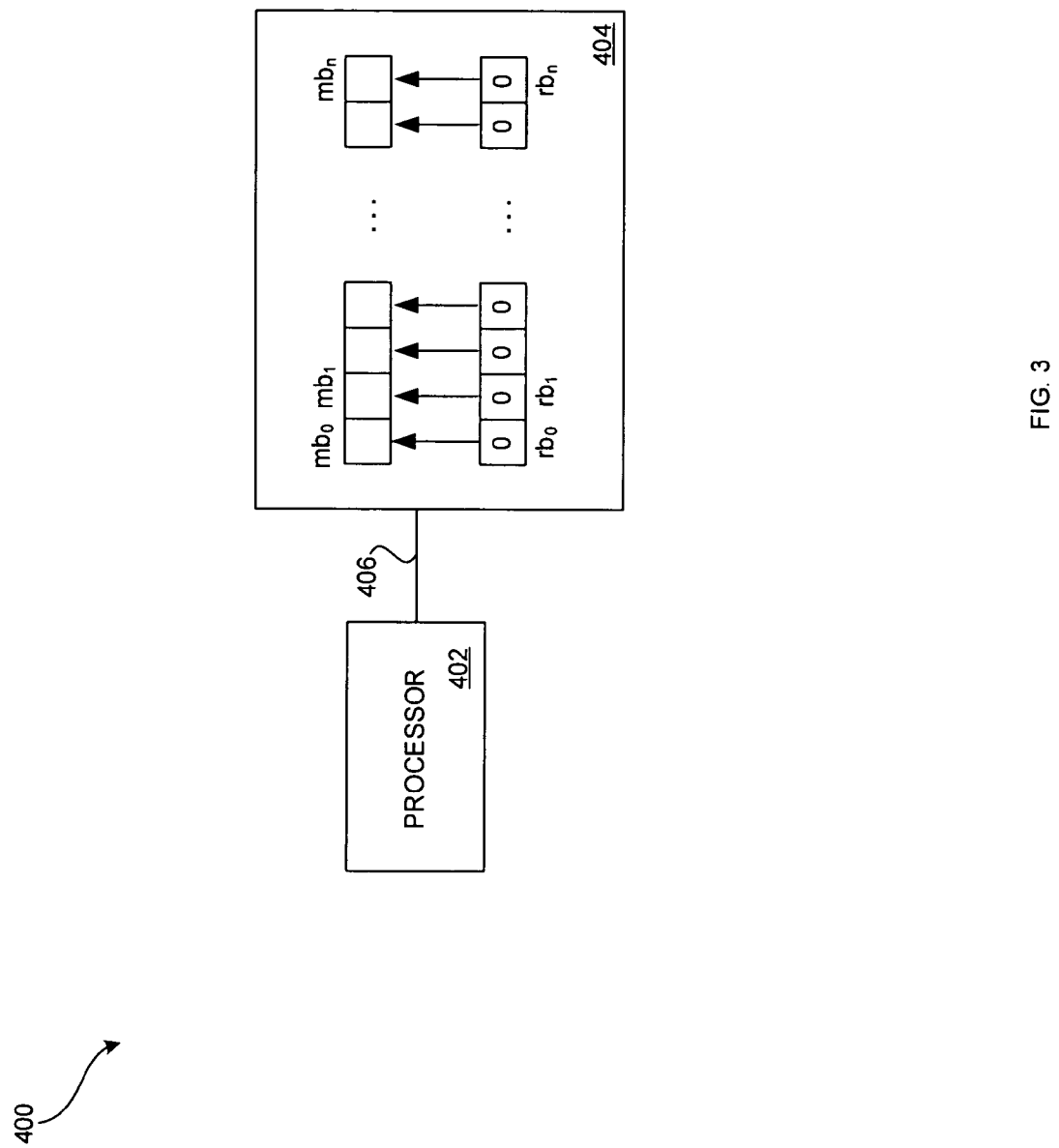
FIG. 3 is a block diagram of an exemplary system for processing multi-stage programming (MSP) bits within one-time-programmable (OTP) memory with unprogrammed memory bits, in accordance with an embodiment of the invention.

FIG. 3 is a block diagram of an exemplary system 400 for processing multi-stage programming (MSP) bits within one-time-programmable (OTP) memory with unprogrammed memory bits, in accordance with an embodiment of the invention. Referring to FIG. 3, the exemplary system 400 for processing MSP bits may comprise a processor 402 and a memory 404. The memory 404 may comprise an OTP memory, for example. In addition, the memory 404 may comprise n number of MSP bits, $mb_0, \ldots, mb_n$, and corresponding n number of register bits, $rb_0, \ldots, rb_n$. Each of the register bits $rb_0, \ldots, rb_n$ may comprise a value of zero, for example, to indicate that the register bit is de-asserted, or a value of one, for example, to indicate that the register bit is asserted. The processor 402 may communicate with the memory 404 via the connection 406. The connection 406 may comprise a wired and/or a wireless connection.

In operation, the MSP bits $mb_0, \ldots, mb_n$, may be initially reset prior to saving any information. To indicate unprogrammed state of the memory bits within the memory 404, the register bits $rb_0, \ldots, rb_n$ may be de-asserted by storing, for example, a value of zero in each register bit. The processor 402 may communicate with the memory 404 via the connection 406 and may determine whether one or more MSP bits may be programmed by determining whether the corresponding register bits are asserted or de-asserted. For example, the processor 402 may determine that register bits $rb_0$ and $rb_1$ are de-asserted since they comprise a value of zero. Consequently, the processor 402 may program the corresponding MSP bits $mb_0$ and $mb_1$, if MSP bits $mb_0$ and $mb_1$ are unprogrammed. Once an MSP bit within the OTP memory 404 is programmed, its corresponding register bit may be asserted, thus preventing any further programming and re-programming attempts for the programmed MSP bit.

Figure 4:
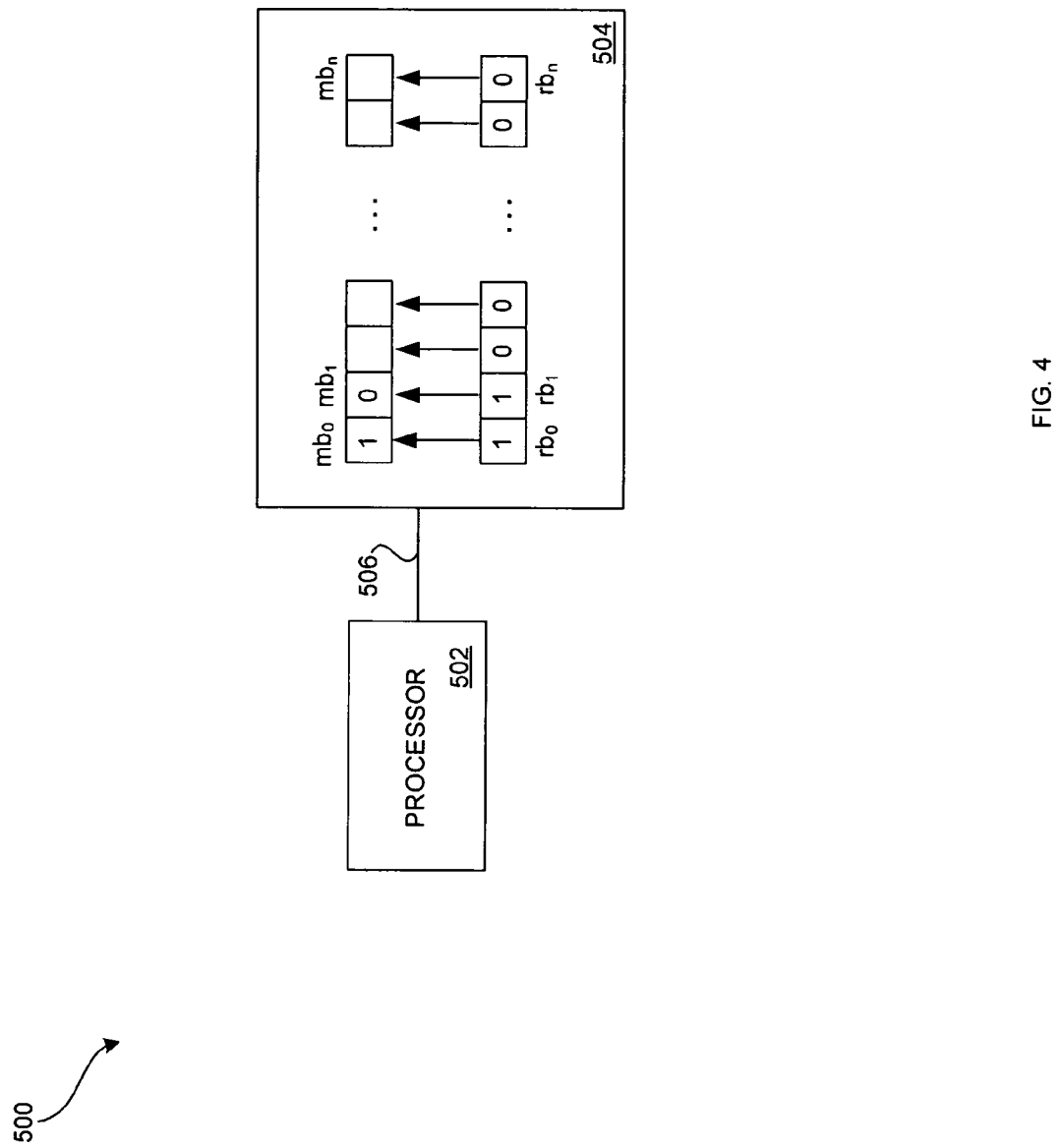
FIG. 4 is a block diagram of an exemplary system for processing multi-stage programming (MSP) bits within one-time-programmable (OTP) memory with partially programmed memory bits, in accordance with an embodiment of the invention.

FIG. 4 is a block diagram of an exemplary system for processing multi-stage programming (MSP) bits within one-time-programmable (OTP) memory with partially programmed memory bits, in accordance with an embodiment of the invention. Referring to FIG. 4, the exemplary system 500 for processing MSP bits may comprise a processor 502 and a memory 504. The memory 504 may comprise an OTP memory, for example. In addition, the memory 504 may comprise n number of MSP bits, $mb_0, mb_n$, and corresponding n number of register bits, $rb_0, rb_n$. Each of the register bits $rb_0, \ldots, rb_n$ may comprise a value of zero, for example, to indicate that the register bit is de-asserted, or a value of one, for example, to indicate that the register bit is asserted. The processor 502 may communicate with the memory 504 via the connection 506. The connection 506 may comprise a wired and/or a wireless connection.

To indicate an unprogrammed state of the memory bits within the memory 504, the register bits $rb_0, \ldots, rb_n$ may be de-asserted by storing, for example, a value of zero in each register bit. One or more of the MSP bits within the memory 504 may be programmed and their corresponding register bits may be asserted. For example, MSP bits $mb_0$ and $mb_1$ may be programmed and corresponding register bits $rb_0$ and $rb_1$ may be asserted by storing, for example, a value of one in each of the register bits $rb_0$ and $rb_1$. The processor 502 may communicate with the memory 504 via the connection 506 and may determine which MSP bits are programmed and which MSP bits are unprogrammed by determining whether corresponding register bits are asserted or de-asserted. For example, the processor 502 may determine that register bits $rb_0$ and $rb_1$ are asserted since they comprise a value of one and register bits $rb_2, rb_n$ are de-asserted since they comprise a value of zero. Consequently, MSP bits $mb_0$ and $mb_1$ may be locked to programming and/or re-programming attempts by the processor 502. However, MSP bits $mb_2, \ldots, mb_n$ may be programmed by the processor 502 since the corresponding register bits $rb_2, \ldots, rb_n$ are de-asserted and the MSP bits $mb_2, \ldots, mb_n$ are unprogrammed.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing multi-stage programming (MSP) bits within one-time-programmable (OTP) memory, the method comprising:
   determining whether at least one MSP memory bit in the OTP memory is programmed;
   determining whether a register bit associated with said at least one MSP memory bit is asserted; and
   programming said at least one MSP memory bit, if said register bit is deasserted and said at least one MSP memory bit is unprogrammed.

2. The method according to claim 1, comprising associating said register bit in the OTP memory with said at least one MSP memory bit.

3. The method according to claim 1, comprising programming said at least one MSP memory bit to logic zero or logic one.

4. The method according to claim 1, comprising blocking programming of said at least one MSP memory bit, if said register bit associated with said at least one MSP memory bit is asserted.

5. The method according to claim 1, comprising resetting said register bit associated with said at least one MSP memory bit, when a hardware reset of the OTP memory is asserted.

6. The method according to claim 1, comprising determining whether said at least one MSP memory bit is accessed.

7. The method according to claim 6, comprising determining a programming status of said at least one MSP memory bit, if said at least one MSP memory bit is accessed.

8. The method according to claim 7, wherein said programming status comprises at least one of: a programmed to logic one status, a programmed to logic zero status, and an unprogrammed status.

9. The method according to claim 7, comprising programming said at least one MSP memory bit, if said determined programming status comprises an unprogrammed status.

10. The method according to claim 9, comprising deasserting said register bit associated with said at least one MSP memory bit, after said programming of said at least one MSP memory bit.

11. A machine-readable storage having stored thereon, a computer program having at least one code section for processing multi-stage programming (MSP) bits within one-time-programmable (OTP) memory, the at least one code section being executable by a machine to perform steps comprising:

determining whether at least one MSP memory bit in the OTP memory is programmed;

determining whether a register bit associated with said at least one MSP memory bit is asserted; and programming said at least one MSP memory bit, if said register bit is deasserted and said at least one MSP memory bit is unprogrammed.

12. The machine-readable storage according to claim 11, comprising code for associating said register bit in the OTP memory with said at least one MSP memory bit.

13. The machine-readable storage according to claim 11, comprising code for programming said at least one MSP memory bit to logic zero or logic one.

14. The machine-readable storage according to claim 11, comprising code for blocking programming of said at least one MSP memory bit, if said register bit associated with said at least one MSP memory bit is asserted.

15. The machine-readable storage according to claim 11, comprising code for resetting said register bit associated with said at least one MSP memory bit, when a hardware reset of the OTP memory is asserted.

16. The machine-readable storage according to claim 11, comprising code for determining whether said at least one MSP memory bit is accessed.

17. The machine-readable storage according to claim 16, comprising code for determining a programming status of said at least one MSP memory bit, if said at least one MSP memory bit is accessed.

18. The machine-readable storage according to claim 17, wherein said programming status comprises at least one of: a programmed to logic one status, a programmed to logic zero status, and an unprogrammed status.

19. The machine-readable storage according to claim 17, comprising code for programming said at least one MSP memory bit, if said determined programming status comprises an unprogrammed status.

20. The machine-readable storage according to claim 19, comprising code for deasserting said register bit associated with said at least one MSP memory bit after said programming of said at least one MSP memory bit.

21. A system for processing multi-stage programming (MSP) bits within one-time-programmable (OTP) memory, the system comprising:

at least one register bit that is associated with at least one MSP memory bit in the OTP memory;

at least one processor that determines whether at least one MSP memory bit is programmed;

said at least one processor determines whether said register bit associated with said at least one MSP memory bit is asserted; and said at least one processor programs said at least one MSP memory bit, if said register bit is deasserted and said at least one MSP memory bit is unprogrammed.

22. The system according to claim 21, wherein said at least one processor associates said register bit in the OTP memory with said at least one MSP memory bit.

23. The system according to claim 21, wherein said at least one processor programs said at least one MSP memory bit to logic zero or logic one.

24. The system according to claim 21, wherein said at least one processor blocks programming of said at least one MSP memory bit, if said register bit associated with said at least one MSP memory bit is asserted.

25. The system according to claim 21, wherein said at least one processor resets said register bit associated with said at least one MSP memory bit, when a hardware reset of the OTP memory is asserted.

26. The system according to claim 21, wherein said at least one processor determines whether said at least one MSP memory bit is accessed.

27. The system according to claim 26, wherein said at least one processor determines a programming status of said at least one MSP memory bit, if said at least one MSP memory bit is accessed.

28. The system according to claim 27, wherein said programming status comprises at least one of: a programmed to logic one status, a programmed to logic zero status, and an unprogrammed status.

29. The system according to claim 27, wherein said at least one processor programs said at least one MSP memory bit, if said determined programming status comprises an unprogrammed status.

30. The system according to claim 29, wherein said at least one processor deasserts said register bit associated with said at least one MSP memory bit after said programming of said at least one MSP memory bit.

* * * * *

UNITED STATES PATENT AND TRADEMARK OFFICE
CERTIFICATE OF CORRECTION

| | | |
|---|---|---|
| PATENT NO. | : 8,032,727 B2 | Page 1 of 1 |
| APPLICATION NO. | : 11/025413 | |
| DATED | : October 4, 2011 | |
| INVENTOR(S) | : Brownhill et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1678 days.

Signed and Sealed this
Thirteenth Day of March, 2012

David J. Kappos
*Director of the United States Patent and Trademark Office*